United States Patent
Sarrion

[11] Patent Number: 6,079,245
[45] Date of Patent: Jun. 27, 2000

[54] DEVICE AND METHOD FOR STRAIGHTENING OUT DAMAGED METAL AND PLASTIC ELEMENTS

[76] Inventor: Sanchez Christian Sarrion, 1, avenue Rude Clos des Manoirs, 91590 La Ferte Alais, France

[21] Appl. No.: 09/297,094

[22] PCT Filed: Nov. 17, 1997

[86] PCT No.: PCT/FR97/02059

§ 371 Date: May 18, 1999

§ 102(e) Date: May 18, 1999

[87] PCT Pub. No.: WO98/22235

PCT Pub. Date: May 28, 1998

[30] Foreign Application Priority Data

Nov. 18, 1996 [FR] France .................................. 96 14129
Oct. 29, 1997 [FR] France .................................. 97 13547

[51] Int. Cl.[7] .................................................. B21D 22/10
[52] U.S. Cl. ........................... 72/63; 72/18.3; 72/21.5; 72/342.5; 72/379.2; 72/705
[58] Field of Search ...................... 72/16.2, 16.3, 72/16.5, 17.3, 18.3, 19.1, 19.6, 19.7, 21.5, 31.02, 31.1, 305, 308, 342.5, 342.6, 342.94, 342.96, 379.2, 705, 63; 27/421.1

[56] References Cited

U.S. PATENT DOCUMENTS

| | | | |
|---|---|---|---|
| 4,358,946 | 11/1982 | Gallant | 72/705 |
| 5,619,876 | 4/1997 | Choi | 72/705 |
| 5,634,361 | 6/1997 | Herschman et al. | 72/31.02 |
| 5,747,693 | 5/1998 | Abbate et al. | 72/31.02 |

FOREIGN PATENT DOCUMENTS

| | | | |
|---|---|---|---|
| 266517 | 4/1989 | Germany | 72/705 |
| 4035806 | 5/1992 | Germany | 72/705 |
| 61-23523 | 2/1986 | Japan | 72/705 |
| 2236499 | 4/1991 | United Kingdom | 72/705 |

*Primary Examiner*—Ed Tolan
*Attorney, Agent, or Firm*—Armstrong, Westerman, Hattori, McLeland & Naughton

[57] ABSTRACT

The invention concerns a device and a method for straightening out damaged metal and plastic elements. The device for straightening out a deformed element is characterized in that it comprises means for exerting pressure (3) on the deformed element (2), means for heating (6) the deformed element, at least a support reinforcement (5) secured to the deformed element (2), optionally a template (7) having the original shape of the deformed element, optionally an external support. The invention is generally useful for repairing deformed metal and plastic elements.

15 Claims, 5 Drawing Sheets

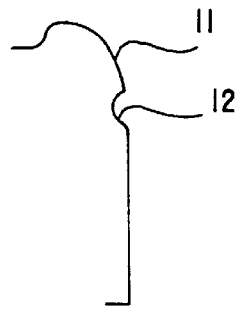
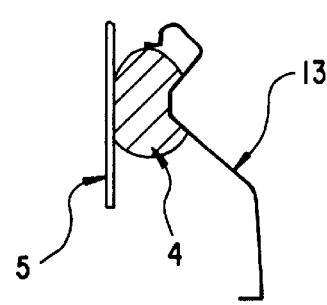
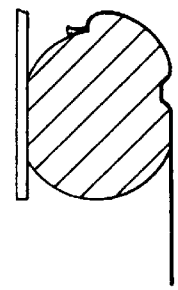
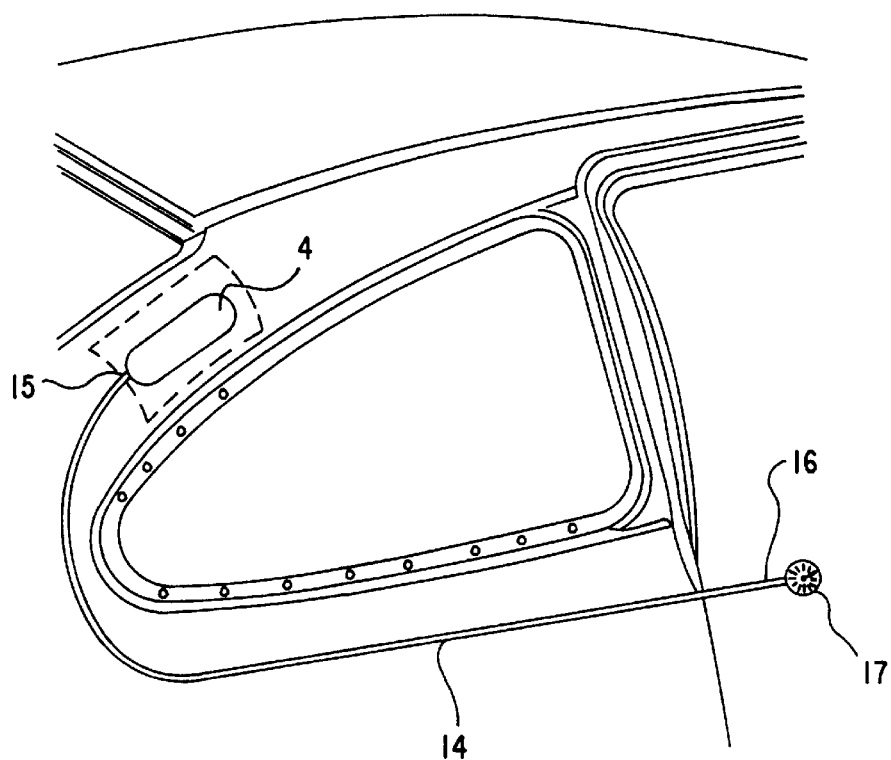

DEVICE AND METHOD FOR STRAIGHTENING OUT DAMAGED METAL AND PLASTIC ELEMENTS

This Application is a 35 U.S.C. 371 of PCT/FR97/02059 filed Nov. 17, 1997.

This invention concerns a device for straightening out damaged metal and plastic elements, namely having bumps and notwithstanding the damage maintaining the main original shape.

DE 94 03 156 U (ROTH MATTHIAS) describes a device for straightening out elements in plastic material. It is not intended to be used for metal elements. This device straightens the elements by means of a body (3) being able to expand by means (2), the body (3) being placed between an abutment and the piece. The device described in this document does not include a template having the original shape of the element to straighten. Furthermore, the device described in this document does not include means for heating the element to straighten.

U.S. Pat. No. 4,171,631 (13UTTS CLIFFORE) describes a device for straightening out a vehicle door and is not intended to straighten just any piece of a motorcar. This device includes an expansible balloon, which is placed inside a door, namely between the walls of the door. In no case an abutment is placed externally to the piece, on which the balloon leans, because the internal wall of the door plays this abutting role. This device allows straightening out elements having two walls and its use is therefore limited. Furthermore, this device does not include a template having the original shape of the piece to straighten. Besides, it does not include means for heating the part of the element to straighten.

U.S. Pat. No. 2,804,118 (BAYERKOHLER) describes in FIG. 1 a device for straightening out car-bodies which includes two pressure plates 5 and 7 that are placed between two walls 65, 67 of a motorcar door, the wall 67 being deformed. This document does not describe nor suggest the utilisation of a template having the original shape of the element to straighten. This document does not describe the use of a device for heating the element to straighten. Presently the straightening is made by means of tools of different forms, using the principle of the lever, or by points of welding made to the exterior of the damaged part, which, generally, involves corrosion and neutralises all the protections (galvanised or others) of the straightened element.

For instance, a present process provides to bare the sheet metal and to weld on it small hollow tablets on a point of their periphery. An end of a tool forming a hook is hooked in the hollow of said tablet. A sliding hammer allows hammering on the end opposite to the tool in such a way to pull the metal sheet and to straighten it out. After straightening, tablets are eliminated with the aid of the tool by carrying out a rotation, then the welding point is removed, for example with the aid of a trimming disk, and the metal sheet filled. Such a process has the scope to greatly reduce the thickness of the metal sheet and therefore to weaken it.

This invention has the scope to avoid the drawbacks of the known means and relates to a device for straightening out deformed elements which is easy to use, safe, effective and simple to realise.

The invention allows carrying out a straightening without altering the elements of the surrounding surface such as the paint, finishing, galvanisation and electro-zinc-coating.

Furthermore, the invention provides a device for straightening out deformed elements, maintaining the original elasticity of the elements to treat and in this way the passive safety of the users of the vehicle.

The invention presents the advantage to provide a device for straightening out deformed elements all preventing the corrosion of the straightened elements.

The device according to the invention allows the straightening of deformed elements, also in the case where they are not easily accessible.

The invention allows therefore the straightening of deformed elements facilitating the straightening, which allows to reduce the intervention time, saving in materials, improving the safety of the work, these advantages reflecting on the final cost of the restoring and of their quality.

For this purpose, the device for straightening out deformed elements according to this invention includes a means exerting pressure on the deformed element, a heating means for heating the deformed element, at least one reinforcing support integral with the deformed element, possibly one or more templates having the original shape of the deformed element, possibly an external support.

The means exerting pressure on the deformed element is an inflated balloon with pressurised fluid whose pressure is controlled. According to another embodiment of the invention, the means exerting pressure on the deformed element is a system equipped with at least one jack, placed on a support of jack, integral with at least one reinforcing support.

The device according to the invention can include two templates having the original shape of the deformed element clamping in sandwich-like-way said deformed element, one of which is placed inside the deformed element and the other being placed outside, flexible jacks and suitable supports acting on said templates in order to form a press.

The device according to the invention furthermore includes an articulated bar, forming a tube, in which a fluid flows, one end of which bears the balloon and the other end of which is equipped with a manometer checking the pressure inside the balloon.

The device can furthermore be equipped with protection means of the balloon.

According to another feature of the invention, the template having the original shape of the deformed element consists of a thermoplastic material, for example a thermoplastic resin, hot casting or an hardening material at room temperature, in an original not deformed part of body-work in order to serve as template.

When one produces a template with a resin, this template has certain flexibility. It is therefore necessary to arm the template with bars of steel. As for the edges and in order to better smooth them, one can also use adapted steel angle.

According to this characteristic one can also use an anvil adapted to all the forms and the thickness of the metal sheet, reinforcing said anvil with parts of sufficient weight.

According to an embodiment of the invention, the element to be straightened is a metal sheet.

According to another embodiment, the element to be repaired is a fibre-reinforced synthetic material.

According to another embodiment, the element to be straightened is a synthetic material without fibres.

The device according to the invention may include an ultrasound emitter acting on the deformed element in order to make it vibrate.

Finally, according to an embodiment of the invention, the device includes a computer system memory and software for collecting and processing data relating to the different elements of the devices, as the forms of templates, internal pressure of balloons, etc.

The invention furthermore relates to a repair method of deformed elements.

The repair method of deformed elements includes the following steps: introducing at least one means for exerting pressure on the deformed element on the opposite side of the side having undergone the deformation, placing a reinforcement in a way that the means for exercising pressure is situated between the deformed part of the element and the reinforcement, activating the means for exerting pressure, heating the deformed element by a heating means, and eventually striking on the deformed part by means of ramming with a tool-weight adapted to the thickness of the sheet metal, introducing if necessary, a template between the deformed element and the means for exerting pressure.

The means for exerting pressure is constituted by one or more balloons filled with fluid under controlled pressure.

According to another embodiment of the method as per this invention, when the deformed element is constituted by a synthetic material having a break, a cloth impregnated with resin is placed on the internal side of the deformed element, a reinforcing support and possibly a template is placed against this cloth, the cloth and the reinforcement being placed in order to be arranged on each side of the break, to be used as a support, then, the balloon is inflated and eventually heated and one proceeds to repair the external face following the traditional method.

The device according to the invention, allows to straighten all metallic hollow bodies and certain plastics, without damaging neither the metallic part nor plastics, and neither the previous treatment of the parts, and reaching the finishing identical to the original.

Besides, the device according to the invention allows to remedy to the drawbacks already cited, but furthermore assuring a very great security for professional proceeding to the restoring of parts, with the help of a considerable attenuation of the noises due to the bumps and the absence of welds.

The device according to the invention, applies preferentially but not limiting the restoring of parts of the body-work of cars, but it can also be used in other sectors of activities and where necessary to intervene to straighten out deformed metal or plastic elements.

This scope is reached by using balloons or flexible jacks, inflated or driven, respectively, by fluids, such as air, water, oil, used as means of pressure.

Another particularity of the invention concerns the utilisation of a heating device having as scope to dilate and soften the parts to be straightened out.

A specific particularity of the invention is in the eventual utilisation of preformed templates serving to bring back the part to be straightened out to its original shape.

The balloon can be inserted very easily in the deformed hollow body, the back part of said balloon rests on the reinforcement of the element (internal part of a door, for example), or on a support bar first placed or fixed with the help of magnetic claw or of suction cups.

The external part of the hollow body to straighten can also include another template, in support with the help of flexible jacks fixed on one or more external supports; said supports being fixed with the help of claws of adaptable attachment and interchangeable or of magnetic claws or of suction cups with vacuum pump.

These associated means have for scope to press the sheet metal or the deformed plastics, in hot or cold condition, which is like that previously taken in sandwich-like-way between the two templates.

The first part of the balloon pushes the template having the original shape of the element.

The following description, in regard to annexed drawings, supplied as example, will allow understanding of how the invention can be realised.

FIGS. 4A, 4B and 4C are schematic views of another embodiment of the device according to the invention, respectively before the straightening of the part to be straightened, during its straightening, and after its straightening.

FIG. 5 is a view of a part of the vehicle to be straightened and the device according to the invention realised during the straightening.

Figure 1:
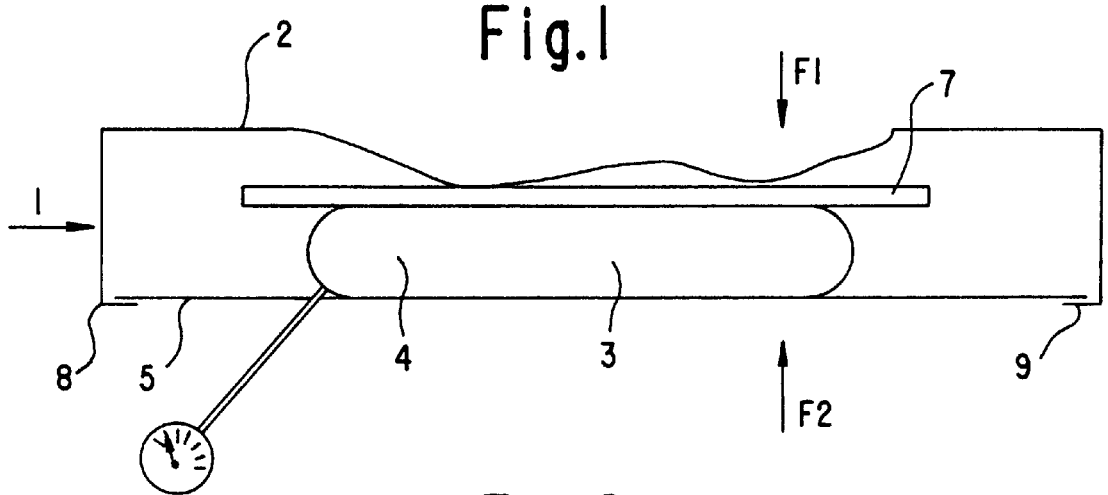
FIG. 1 is a schematic view of the straightening device according to the invention, placed in position before the straightening of the part to be straightened.

The straightening device 1 of the deformed element 2 includes, according to the invention, a means 3 for exerting pressure on the deformed element 2. In FIGS. 1 to 5, the means for exerting pressure is a balloon, while in FIGS. 6 and 7, the means for exerting pressure is a jack.

The means 3 for exerting pressure rests on a reinforcing support, which forms part of the deformed element 2. For instance in FIGS. 1 to 3, the balloon 4, when it is inflated rests on one side on the reinforcing support 5 and on the element 2 to straighten.

The device furthermore includes a means 6 for heating the deformed element 2 and heating a template 7 having the original shape of the element to be straightened.

Figure 6:
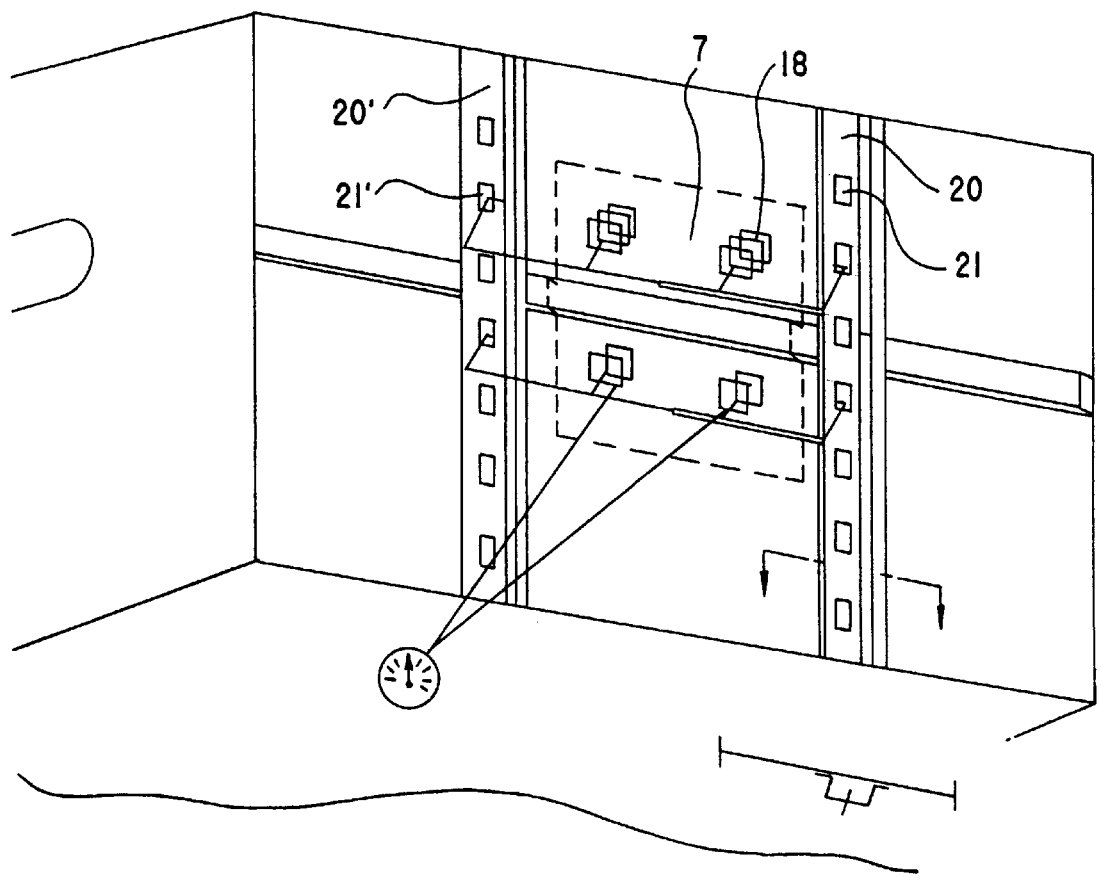
FIG. 6 is a schematic view of an embodiment of the device according to the invention having flexible jacks as means for exerting pressure.
Figure 7:
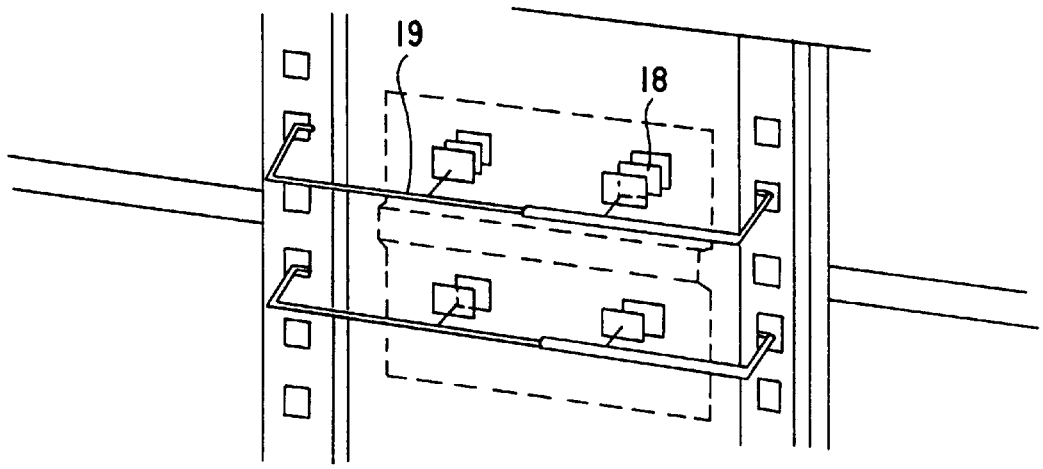
FIG. 7 is a detailed view of FIG. 6
Figure 8:
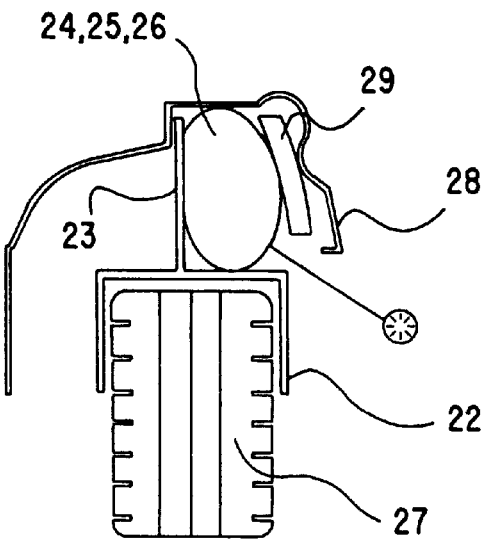
FIG. 8 is a schematic view showing the shape of the reinforcement used for the straightening of a part of the vehicle.

The method for straightening out a deformed element according to the invention is the following: a not inflated balloon is introduced on the opposite side to the side having the deformation. For instance, if a pressure in the direction of the Arrow F1 has deformed the element, the balloon 4 is introduced in the direction opposed to the direction of the deformation, namely according to the Arrow F2. Then, a reinforcement 5 is placed in such a way that the balloon 4 is placed between the deformed part of the element to be restored and the reinforcement 5. The reinforcement 5 mostly has a shape of a plate, as represented in FIGS. 1 to 5, but it can have different forms as represented in FIGS. 6 to 8. These forms will be disclosed in the description that follows. The reinforcement 5, is, according to the embodiment represented in FIGS. 1 to 3, maintained at its ends by bends 8 and 9 of the piece having the part to be straightened.

The method consists then of filling the balloon with a fluid. The balloon 4 then exercises a pressure in the direction of the Arrow F2 on the deformed element. This part takes again a shape almost identical to that of the original. However, as there can be imperfections in the perimeter of the deformation, the process consists in heating the deformed part with the help of a heating means, constituted for example by a gun blowing hot air, an infrared thermal gun, or other. In order to eliminate imperfections, the deformed part can be lightly truck by means of a rammer 10, of a weight adapted to the thickness of the sheet metal.

For the finishing, a spot light is placed in order to show the least imperfections to then treat them.

Figure 3:
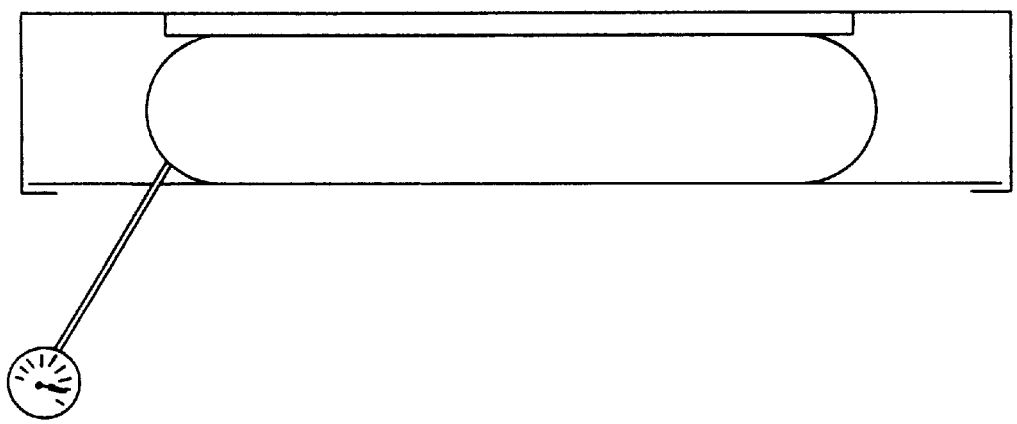
FIG. 3 is a schematic view of the device of FIG. 1, after straightening of the part to be straightened.

The element treated in such a way, then takes its original shape, as represented in FIG. 3.

The device and the method of the invention are easy to use and respectively to realise.

The balloon can be easily inserted into a hollow body, it rests on the reinforcement and puts itself into position taking all the desired forms, and it has the function of a flexible jack when it is inflated.

According to the invention, the inflation of the balloon is controlled, for example with the help of a manometer. Thus, the balloon can be inflated up to a pressure, which can rise by 100 g up to 200 g or more, if at the time of the first straightening the element has not exactly retaken its original shape.

The balloon can take any desired geometric shape, round, square, coiled, rectangular, and be realised in any desired material, for example in rubber or in synthetic rubber or other.

Figure 2:
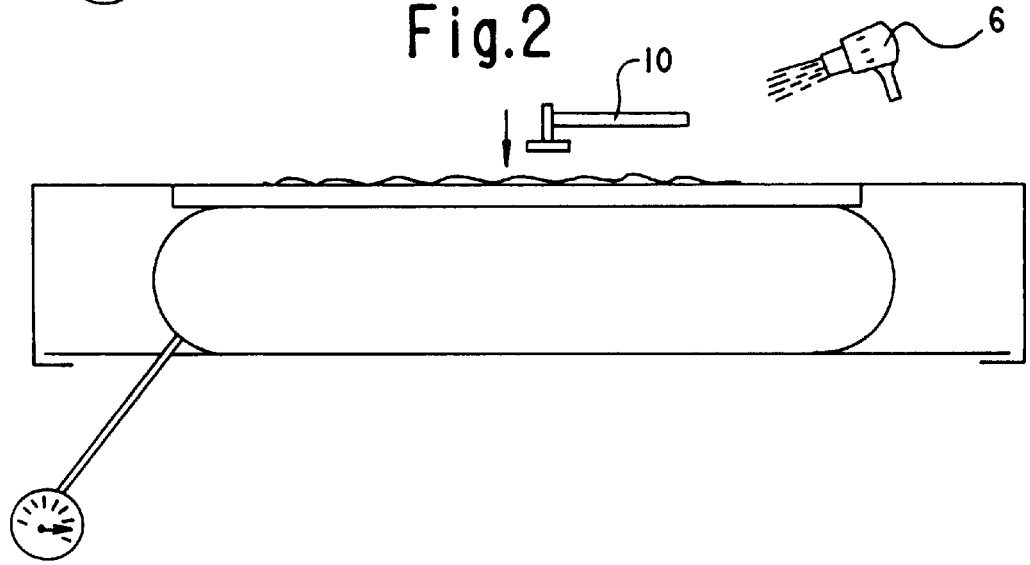
FIG. 2 is a schematic view of the device of FIG. 1, in an intermediate stage of straightening.

In FIGS. 1 to 3, a template 7 is shown, which allows the deformed part to take its original shape. However, the use of a template is not obligatory. Thus, as represented in FIGS. 4A, 4B and 4C, when the element 11 has a recess form 12, the balloon 4 when it is inflated, in a first stage, takes the shape of the form resting between the reinforcement 5 and the deformed part 13, and then pushes the deformed part which then takes again its original shape. Thus, when a template is not used, only the elasticity of the material of the deformed element is utilised.

The deformed element can be metallic or in fibre-reinforced synthetic material.

As represented in FIG. 5, the balloon 4 has an articulated bar 14 forming a tube, in which a fluid flows, one end of which 15 bears the balloon 4 and the opposed end of which 1B is equipped with a pressure controller 17, constituted for example by a manometer.

The fluid, which allows inflating the balloon, is preferably a neutral fluid such as compressed air, which allows avoiding accidents of explosions, catching fire, etc.

The articulated bar allows the easy introduction of the balloon inside a hollow piece, as for example a vehicle mudguard.

Figure 9:
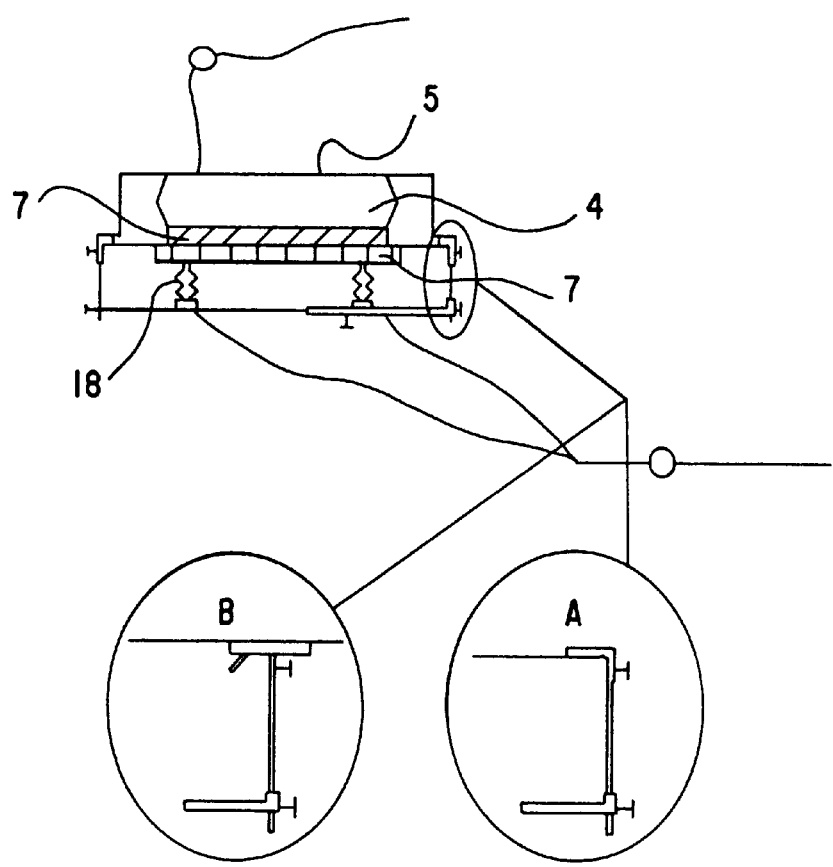
FIGS. 9, 10 and 11 show the setting-up of the devices according to the invention on the inside and outside of the deformed hollow body to be straightened.
Figure 10:
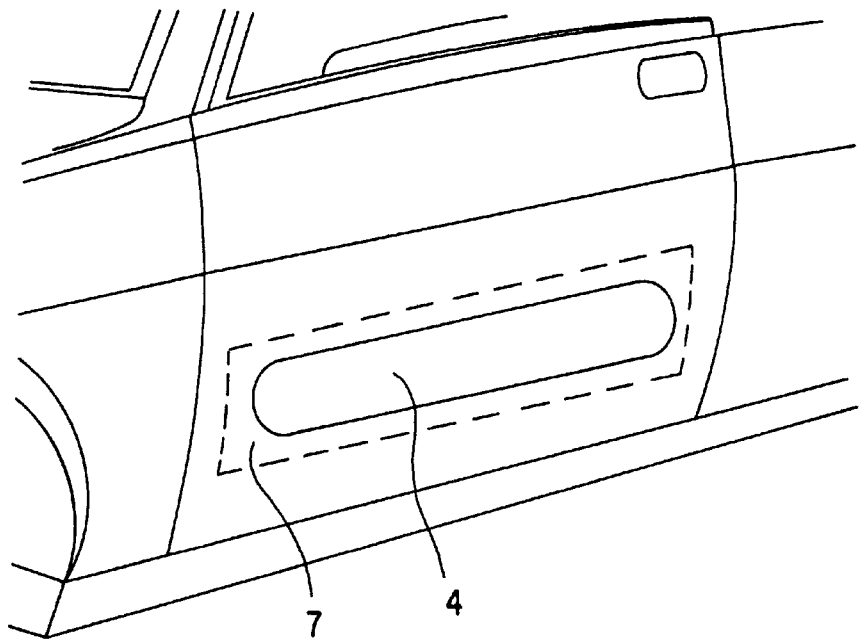
Figure 11:
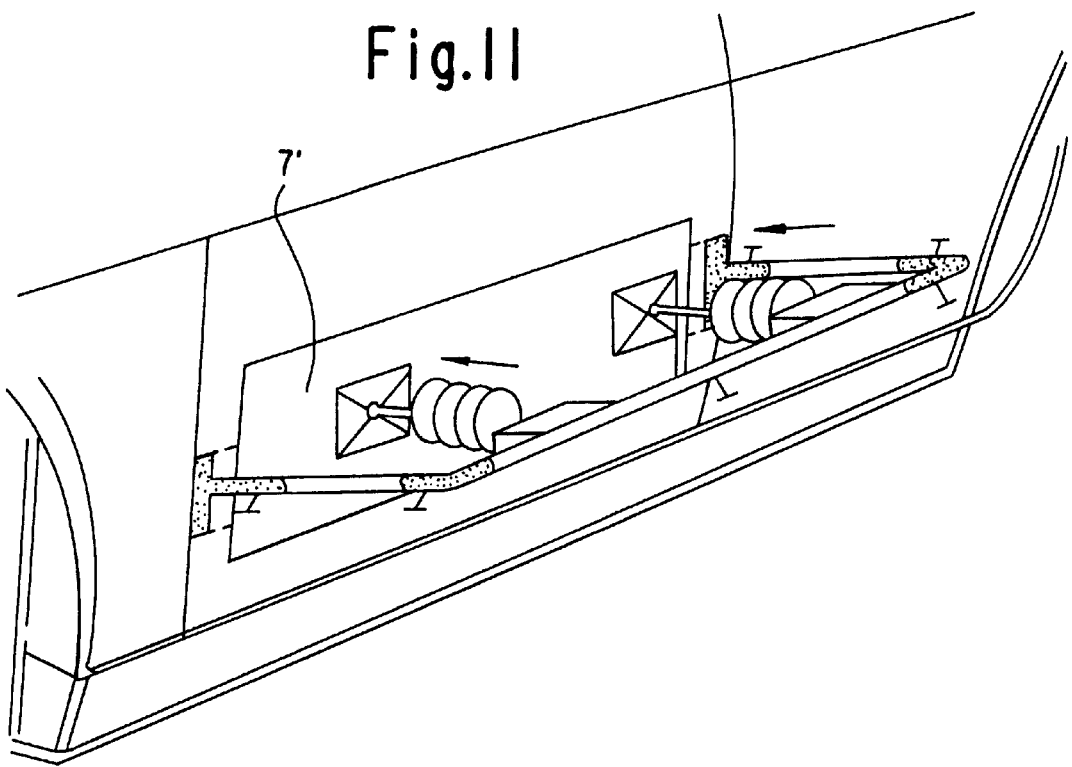

Possibly, the device according to the invention can include an external support (eg. as represented in FIGS. 9, 10 and 11). Said support is placed on the external face of the hollow deformed element to be straightened, which allows to clamp in a sandwich-like way the deformed element between the balloon 4 equipped with a template 7 and another template 7' external in support, with the help of flexible jacks fixed on the external support and forming a press.

According to another embodiment represented in FIGS. 6 and 7, the means for exerting pressure on the deformed element is a system of at least one jack 18 placed on a jack support 19, the jack support 19 being integral with at least one support reinforcement 20.

Preferably, the device according to this embodiment includes two support reinforcements 20, 20' of longitudinal shape, fixed by the piece of body-work having the deformed element. Thus, the piece of body-work can be a panel of a truck. The reinforcements can for example include a set of holes 21, 21' in which the ends of supports 19 of jacks 18 are introduced. Preferably, the supports 19 consist of two bars sliding one in relation to the other, which allows adapting the length of the support 19 to the spacing of the reinforcements 20 and 20'. Several supports can be placed one over the other and several jacks 18 can be integral with these supports. If the reinforcements do not include the holes, one easily can realise them by suitable drillings or use magnetic claws or suction vacuum pump cups, fixed on the inner flat parts of the body-work. In this embodiment, one can either use templates, or not use them. In FIG. 7, the template 7 is represented in dotted lines.

FIG. 8, represents a reinforcement 22 more specially realised for the repair of front mudguards of motorcars; This reinforcement 22 which, in cross section, has a U-shape is equipped with a plate 23 perpendicular to the U. The U-shaped part, rests on the wheel of a vehicle. The plate 23 is intended to act as support of the single or several balloons 24, 25, 26, which is or are placed) between the plate 23, in the passage of wheel 27, the part to be straightened 28 and possibly the template 29.

According to this embodiment, the template 29 can be used or not.

The template can be realised by making flow a heated duroplastic resin in a part of the body-work, for example a mudguard of the same type not deformed, which serves then as template. When cooling, the resin hardens and the template is then removed.

The method according to this invention can be used for straightening metal elements or elements in fibre-less synthetic material. When the element to be straightened is in fibre-reinforced synthetic material, the received bumps mostly engender a breakage of the element. Then a cloth impregnated with resin is placed inside the piece to be repaired, namely on the internal side. Against this cloth a reinforcing support and possibly a template is placed. The cloth and the reinforcement are arranged in order to be placed on either side of the breakage. Then, the balloon is inflated and possibly heated. The two sides of the breakage are thus maintained firmly and it is then possible to carry out the repair in external face in a traditional way.

According to another different embodiment of the invention, it is also possible to use an ultrasound emitter with the purpose of making vibrate the sheet metal and help it thus to take its original shape, which allows to considerably improve the yield and the planning of the metal sheet of the element to be treated.

What is claimed is:

1. Device for straightening out a deformed element having undergone a deformation from an original shape, comprising:

a pressure means for exerting pressure on the deformed element, a means for heating the deformed element, and at least one reinforcing support integral with said deformed element, wherein the means for exerting pressure on the deformed element is a balloon inflated by means of a fluid whose pressure is controlled, said device including two templates having the original shape of the deformed element, said two templates facing each other so that said deformed element is positioned between said two templates, one of said templates being placed inside the deformed element and the other of said templates being placed outside the deformed element, and said two templates being supported by supports and connected to flexible jacks acting on said templates so as to form a press.

2. Device according to claim 1, wherein the templates having the original shape of the deformed element are made of a thermoplastic material which is hot-cast, or are made of a hardening material which hardens roughly at room temperature, said hardening material having been cast in a part having the original shape of the deformed element.

3. Device according to claim 2, wherein the templates are reinforced with steel bars and edges of the templates are equipped with L-shaped members.

4. Device according to claim 1, which includes an ultrasound emitter means acting on the deformed element in order to make it vibrate.

5. Device according to claim 2, which includes an ultrasound emitter means acting on the deformed element in order to make it vibrate.

6. Device according to claim 3, which includes an ultrasound emitter means acting on the deformed element in order to make it vibrate.

7. Device according to claim 1, which includes a computer memory and a software collecting and processing data relating to at least one characteristic of the element to be straightened, including its original shape, as well as different data.

8. Device according to claim 2, which includes a computer memory and a software collecting and processing data relating to at least one characteristic of the element to be straightened, including its original shape, as well as different data.

9. Device according to claim 3, which includes a computer memory and a software collecting and processing data relating to at least one characteristic of the element to be straightened, including its original shape, as well as different data.

10. Device according to claim 4, which includes a computer memory and a software collecting and processing data relating to at least one characteristic of the element to be straightened, including its original shape, as well as different data.

11. Device according to claim 7, wherein the different data includes data selected from the group consisting of a shape of the templates, an inner pressure of the balloon or inner pressures of the baloons, and a temperature of the heating means.

12. Device according to claim 8, wherein the different data includes data selected from the group consisting of a shape of the templates, an inner pressure of the balloon or inner pressures of the balloons, and a temperature of the heating means.

13. Device according to claim 9, wherein the different data includes data selected from the group consisting of a shape of the templates, an inner pressure of the balloon or inner pressures of the balloons, and a temperature of the heating means.

14. Device according to claim 10, wherein the different data includes data selected from the group consisting of a shape of the templates, an inner pressure of the balloon or inner pressures of the balloons, and a temperature of the heating means.

15. Method for repairing deformed elements comprising the following steps:
   introducing at least one means for exerting pressure on a deformed element having a side having undergone a deformation from an original shape on a side opposite the side having undergone the deformation,
   placing a reinforcement so that the means for exerting pressure is situated between the deformed element and the reinforcement,
   introducing a template having the original shape of the deformed element between the deformed element and the means for exerting pressure,
   activating the pressure means,
   heating the deformed part by means of a heating means, and optionally striking the deformed part by means of ramming,
   finishing using a spot light in order to show remaining imperfections and correcting said imperfections,
   wherein the means for exerting pressure comprises at least one balloon filled with fluid under a controlled pressure and two templates having the original shape of the deformed element, said two templates facing each other so that the deformed part is positioned between said two templates, one of said templates being placed inside the deformed element and the other of said templates being placed outside the deformed element, and said two templates being supported by supports and connected to flexible jacks acting on said templates so as to form a press.

* * * * *